Feb. 22, 1966 J. R. KAPPEL 3,236,961
TIME MECHANISM HAVING SELECTIVELY VARIABLE TIME RANGES
WITH CONTINUOUS CONTROL OF TIME THEREIN
Filed June 28, 1962 2 Sheets-Sheet 1

INVENTOR.
JOSEPH R. KAPPEL
BY
Gardner & Zimmerman
ATTORNEYS

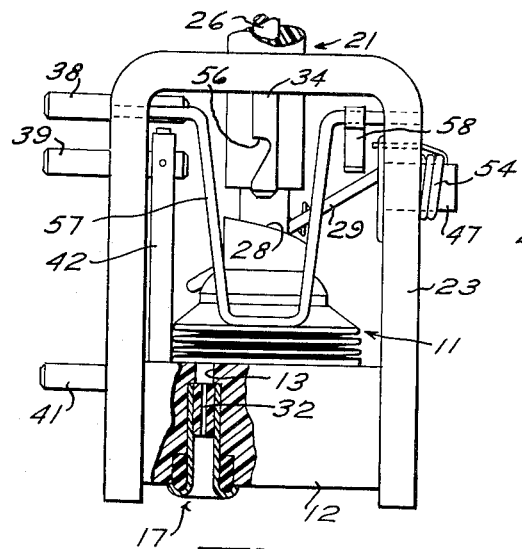
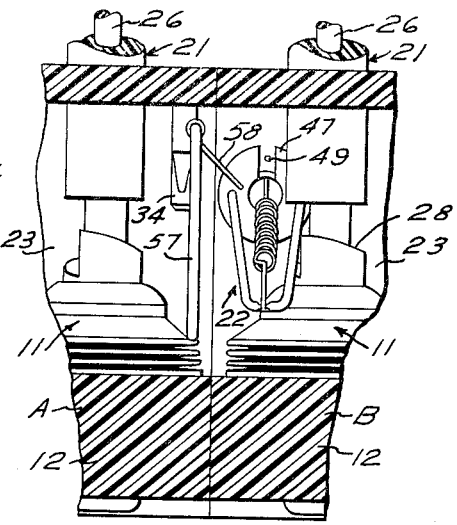
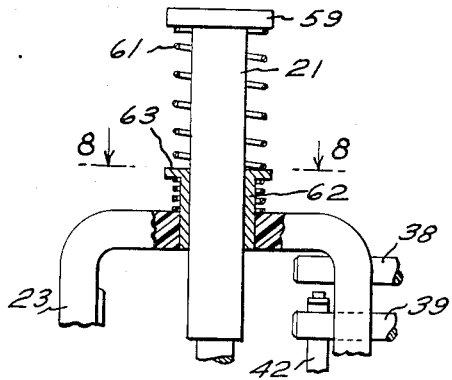
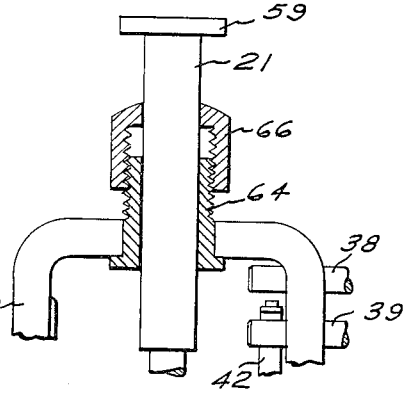
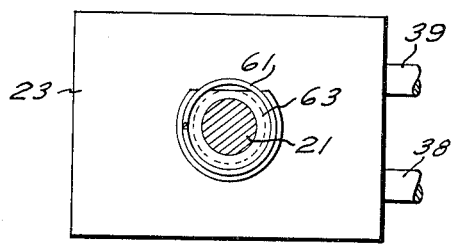

United States Patent Office 3,236,961
Patented Feb. 22, 1966

3,236,961
TIME MECHANISM HAVING SELECTIVELY VARIABLE TIME RANGES WITH CONTINUOUS CONTROL OF TIME THEREIN
Joseph R. Kappel, Novato, Calif., assignor to Fluristor Corporation, Corte Madera, Calif., a corporation of California
Filed June 28, 1962, Ser. No. 205,897
13 Claims. (Cl. 200—34)

This invention relates to control devices for triggering various events in predetermined time relation to each other, and is particularly directed to a small compact, rugged time control device which is continuously variable over each one of a substantially infinite number of timing ranges.

My prior U.S. Patent No. 3,027,746, which issued April 3, 1962, discloses a device for producing a time delay which is determined by the time required for air or other fluid having a predetermined rate of flow into or out of an enclosed volume to produce a given volumetric change thereof. More particularly, the enclosed volume of fluid is arranged to operate on a movable member such as a piston, diaphragm, bellows, or the like to effect movement thereof, through distances determined by the changes in the enclosed volume. Upon movement of the member through a given stroke distance corresponding to a predetermined change in the enclosed volume, a suitably located triggering mechanism is contacted by the member and actuated. The time required for the member to move through its stroke distance is determined by the rate at which fluid flows into or out of the enclosed volume to effect the predetermined volumetric change. Through the employment of interchangeable flow control units, each having a different precise flow rate control capability, to determine the rate of fluid flow through a flow path extending between the enclosed volume and atmosphere, the stroke time of the movable member, and hence the delay time of the control, may be correspondingly precisely varied.

It will be appreciated that in the time control of my prior patent, the delay or control time could only be varied in steps which depended upon the fixed flow rates of the respective flow control units interchangeably employed therewith. Greater versatility of control can be obtained where provision is made for continuous variation of delay time up to a maximum determined by the flow rate of the particular flow control unit employed therewith. The delay time may thus be continuously varied over many different time ranges which are each set by a different one of the interchangeable flow control units.

Accordingly, it is an object of the present invention to provide a selectively variable time control device of the type wherein delay time is determined by the volume rate of flow of air or other fluid into or out of an enclosed volume acting on a movable member to produce triggering movement thereof in accordance with predetermined changes in the enclosed volume.

Another object of the invention is the provision of a time control device of the class described wherein a plurality of control times are selectable by employment of interchangeable flow rate control units to vary the rate of flow of fluid into or out of the enclosed volume and wherein means are provided to interact with the movable member to provide continuous time variation throughout ranges between zero and the control times determined by the respective control units.

It is still another object of the invention to provide a time control device of the class described which is arranged to permit selective triggering of the actuating mechanism at any time during the timing out period of the control.

Yet another object of the invention is the provision of a time control device of the class described which may be arranged for use in tandem with a number of like devices to actuate one device in response to the timing out of another.

A further object of the invention is to provide a time control device of the class described which may be readily embodied in a time delay electric switch.

A still further object of the invention is to provide a time control device of the class described which, although being readily manufacturable on a mass production basis without complicated precision machinery, is capable of infinitely reproducible precision timing operation.

The invention possesses other objects an features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 5 is an elevation view with portions broken away of a modified form of the control device.

FIGURE 6 is a cross sectional view of several of the modified timing devices taken at a vertical plane normal to that of FIGURE 5.

FIGURE 7 is a fragmentary elevational view with portions broken away of still another modified form of the timing device employing an alternative means for continuous variation of delay time.

FIGURE 8 is a sectional view taken at line 8—8 of FIGURE 7.

FIGURE 9 is a fragmentary elevational view with portions broken away of yet another modified form of the timing device which employs another alternative means for continuous variation of delay time.

Figure 1:
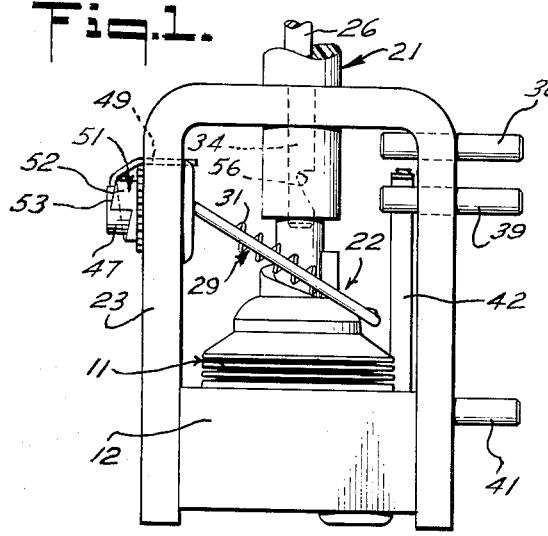
FIGURE 1 is an elevational view of the time control device of the present invention embodied in a continuously variable time delay switch, the switch being illustrated in actuated condition at the start of a timing out cycle.

Referring now to the drawings, FIGURES 1–4 in particular, the time control device of the present invention will be seen to include a bellows 11 which defines an enclosed volume and also functions as a movable member acted upon by the enclosed volume for movement in accordance with volumetric changes therein. The bellows is mounted in upright position upon a base block 12 which has inlet and outlet passages 13, 14 extending therethrough into communication with the interior of the bellows. The outlet passage 14 is fitted with a check valve, as indicated at 16, which permits the flow of air through the outlet passage upon collapse of the bellows but blocks the flow of air the remainder of the time. The valve hence opens the outlet passage to facilitate exhaust of air from the bellows upon its collapse and thereafter closes the outlet passage such that the bellows expands at a rate which depends upon the rate air flows into the bellows through the inlet passage 13.

To facilitate control of the rate at which air flows through the inlet passage, same is arranged to receive any suitable flow rate control unit. In this regard, the inlet passage is preferably enlarged at its base end to facilitate insertion of a flow control unit 17 of the type which includes a tube 18 having an inlet and an outlet and a core 19 of porous material within the tube between the inlet and outlet thereof. The core establishes a fixed resistance to fluid flow in precise proportion to the porosity and thickness of the core material. Numerous materials are suitable for this purpose, e.g., various material or synthetic fibrous materials such as cotton, kapok, and the like. More preferably, the core material comprises clay or various other silicate compounds including those known commercially as diatomaceous earth, "cab-o-sil," activated attapulgite, and "micro-cel." The cores of these latter materials may be provided in powdered or granulated form, and preferably in the form of a compacted homogeneous mass. Where granulated cores are employed, alternative materials include talc, powdered or granulated ceramic and the like. Whatever the material employed, the fixed degree of compression or compaction thereof as well as the thickness of the core in the direction of flow determines the core porosity, and therefore a fixed value of resistance to the flow of air or other fluid through the tube 18. It will be appreciated that flow control units 17 having varied flow resistance capabilities may be interchangeably employed in the inlet passage 13 to correspondingly vary the flow rate of air therethrough into the bellows 11.

Thus after the bellows 11 is collapsed, air flows through the inlet passage 13 into the bellows at a rate precisely set by the flow resistance of the particular flow control unit 17 employed therewith. A precise time interval is hence set by the flow control unit 17 for a predetermined volume of air to flow into the bellows productive of expansive movement of the bellows through a predetermined stroke distance. Upon movement of the bellows through such distance, it contacts a suitable correspondingly located actuating means for an electrical circuit, latch, or other mechanism to thus trigger same after the time interval determined by the flow control unit. To the extent described hereinbefore, the time control device is substantially identical to that disclosed in the previously referenced Patent No. 3,027,746. It will be appreciated, moreover, that various alternative forms of movable members, such as a piston, diaphragm, or the like, may be employed in place of the bellows 11 of the present invention in the manner contemplated by the patent.

As noted previously herein, the delay time of the time control device described to this point can be only varied in steps determined by the flow resistance of the control units 17 interchangeably employed therewith. It is of course desirable that the delay time be continuously variable up to whatever maximum delay is established by the flow control unit 17. To this end in accordance with the particularly salient aspects of the present invention an actuating plunger 21 is arranged to depress the bellows 11 and trip an actuating hammer 22 upon movement of the bellows through predetermined distances. The plunger 21 preferably slidably extends through the web of a U-shaped frame 23 having its parallel legs extending upwardly from opposite sides of base block 12, the web thus overlying the bellows. The plunger is provided with an axial bore 24 extending partially therethrough, such bore receiving a guide pin 26 projecting from the base and axially through the bellows in sealed relation thereto. The bore is of a sufficient diameter to allow the plunger to be rotatable and axially slidable relative to the pin for purposes subsequently described. A helical spring 27 is concentrically mounted upon the pin within the bellows between its upper end and the base block. Such spring is not sufficiently strong to radially implode the bellows. It will be appreciated that the resilient force of the bellows urging its expansion forms a reduced pressure within the bellows whereby a pressure differential is formed across the unit 17 causing air to flow therethrough at a controlled rate. A further parameter in controlling the rate of bellows expansion in addition to the fluid resistance of the unit 17 is thus afforded by the provision of the helical compression spring 27. More particularly, the axially expanding force of the spring adds to the inherent resiliency of the bellows whereby the rate of expansion can be additionally controlled through selection of springs of varying force. It is important to note that in general the combined expanding forces of the bellows and spring need be only sufficient to insure expansion of the bellows and overcoming of the load imposed by the triggering means.

It is particularly important to note that the lower end of the plunger is provided with a concentric spiral groove 28, preferably of a single turn. The inclined edges of the groove engage the actuating hammer 22. The hammer is of the dead centering variety including a frame member 29 pivotally mounted at one side of the frame 23 and projecting therefrom to one side of the plunger through its groove. A spring 31 is secured between the projecting end of the frame member 29 and the frame 23 such that the frame member has a horizontal dead centering position. Pivotal movement of the frame member in either direction beyond horizontal position causes the spring to quickly force the frame member through continued pivotal movement in the same direction. Thus upon depression of the plunger, the upper edge of the spiral groove engages the hammer and pivots same downwardly beyond dead center such that the hammer is thereafter quickly snapped further downward into engagement with the inclined surface of the groove as depicted in FIGURE 1. The depressed bellows then expands with the engaged portion of the groove surface correspondingly urging the hammer upward. When the point of the groove surface that is engaged by the hammer reaches the same level as the pivot thereof (dead center position of the hammer) the hammer is quickly pivoted upward by its spring. It will be appreciated that upon rotation of the plunger upon the pin 26, the point along the inclined surface of the groove at which engagement of the hammer occurs is varied. Accordingly, the vertical distance between the point of engagement and the dead center position of the hammer (hammer stroke distance) is correspondingly varied as is therefore the time required for the expanding bellows to urge the hammer to dead center position. Thus the time interval between depression of the bellows and the instant the hammer is tripped is continuously variable by rotation of the plunger 21. By proper selection of the pitch of the spiral groove relative to the other parameters of the device, maximum thickness of the groove surface may be made to correspond to zero delay, viz., the point of the groove surface engaged by the hammer is at its dead center position. Minimum thickness of the groove surface may likewise be made to correspond to a distance to dead center equal to maximum excursion of the bellows, in other words a maximum delay determined by the rate of air flow through the control unit 17. The spiral groove of the plunger when so arranged thus facilitates continuous variation of time relay through ranges extending between zero and the maximum delay determined by the particular flow rate of the control unit 17 employed. Where relatively short maximum delays are desired the control unit 17 may be in the form of a pin hole orifice 32 as depicted in FIGURE 5.

In order that the maximum and minimum extremes of the range of delays adjusted by rotation of the plunger may be readily set, a pin 33 projects radially from the plunger for engagement with a stop 34 that depends from the web of the frame 23. When the plunger is rotated in one direction, e.g., counterclockwise, to a position where the pin engages the stop, maximum thickness of the groove surface is presented to the hammer productive of zero delay. Rotation of the plunger in the opposite direction, viz., clockwise, to a position where the pin engages the stop presents minimum thickness of groove surface to the hammer productive of maximum delay.

For purposes of ready assembly of the time control device, the stop 34 is preferably removably inserted into a bore 36 through the web which is disposed at the outer end of a keyway 37 extending radially outward from the bore in which the plunger 21 is slidably disposed. The keyway is of a sufficient width to permit passage of pin 33 therethrough. The plunger with pin 33 projects radially therefrom may hence is readily inserted through the bore and keyway into assembled relation with the guide pin 26. The stop 34 may then be inserted into the bore 36 into operative relation to the pin 33, at the same time sufficiently closing the keyway to prevent passage of the pin 33 therethrough.

Figure 2:
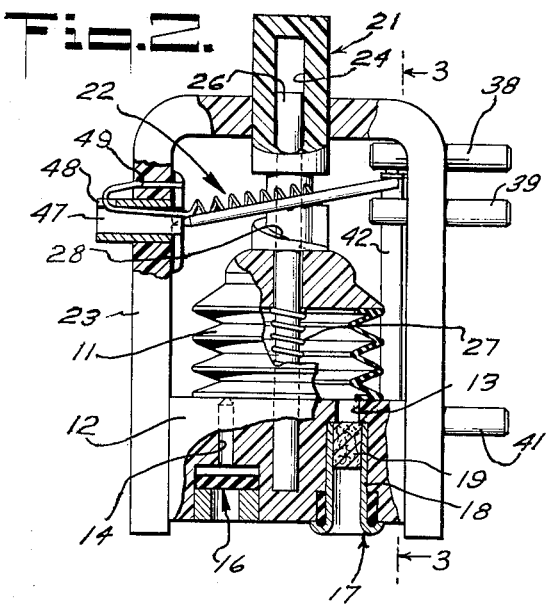
FIGURE 2 is a view similar to FIGURE 1, but with portions broken away and shown in section and illustrating the condition of the switch at the end of a timing out cycle.
Figure 3:
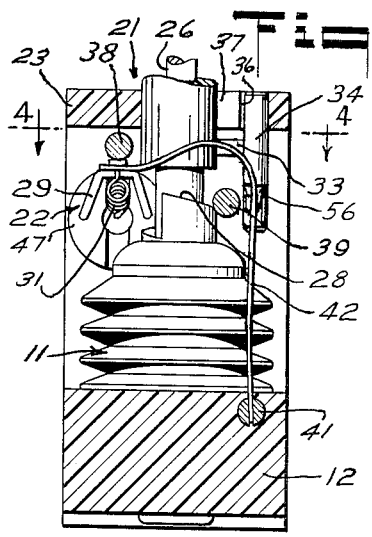
FIGURE 3 is a sectional view taken at line 3—3 of FIGURE 2.

The foregoing control of tripping of the hammer is utilized to great advantage in the instant embodiment to responsively open and close switch contacts. Tripping of the hammer may of course be utilized for various other triggering applications and the invention is accordingly not to be limited to the specific electrical switch embodiment herein disclosed. In the switch a terminal pin 38 extends through the opposite side of the frame 23 from that upon which the hammer frame member 29 is pivoted. The pin is slightly upwardly displaced from the dead center position of the hammer and is engageable thereby when the hammer surpasses dead center in an upward direction. A second terminal pin 39 extends through the same side of the frame as pin 38 and is transversely and downwardly displaced therefrom. A third terminal pin 41 is spaced downwardly from pin 39 and a resilient contact strip 42 is secured thereto and extends upwardly therefrom. The strip is looped over pin 39 and projects beneath pin 38 between same and the tip of the hammer. The tension on the strip is such that it is normally urged into contact with pin 38 by the hammer 22 as shown in FIGURE 2 and simultaneously urged out of contact with pin 39. Thus a circuit between the pin 41 and pin 39 would be open. Upon depressing the plunger, however, the hammer is urged out of engagement with the contact strip and it springs out of contact with pin 38 and into contact with pin 39 thus opening the first circuit and closing the second. After the time delay determined by the bellows expansion and setting of the plunger groove, however, the hammer trips up into engagement with the strip to return it to its normal position thus reclosing the first circuit and opening the second.

Figure 4:
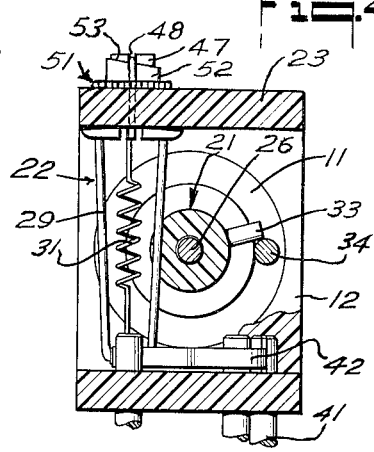
FIGURE 4 is a sectional view taken at line 4—4 of FIGURE 3.

It will be appreciated that slight variations in the time delay produced by the switch may occur due to aging of the hammer spring 31. The tension of spring 31 may vary after extended use of the switch, or for other reasons, thus slightly altering the time required for the hammer to snap from its dead center position into engagement with the contact strip 42. Hence where extreme accuracy in the time delay of the switch is desired, means may be advantageously added to the fixed tension spring termination of FIGURE 2 to provide a vernier adjustment of the spring tension. In a fixed termination the end of spring 31 adjacent the pivot point of the hammer is preferably led through a bushing 47 mounted in the proximal side of the frame 23 and projecting exteriorly therefrom. The end of the spring is reentrantly turned to extend through a slot 48 extending longitudinally inward from the projecting end of the bushing and then into a bore 49 through the side of the frame 23 at a position vertically displaced from the bushing. With such spring termination vernier adjustment of tension is readily facilitated by incorporation of an adjusting wheel 51 concentrically mounted upon the projecting end of the bushing in rotatable relation thereto as depicted in FIGURES 1 and 4. The wheel includes a hub 52 formed with a single turn helical end edge 53 which engages the spring where it extends through the slot 48. Thus as the wheel is rotated and different portions of the helical edge 53 abut the reentrant bend of the spring, the spring is incrementally forced outwardly or inwardly depending upon the direction of wheel rotation. The tension of the spring is correspondingly varied in small amounts whereby precise incremental changes in the time required for hammer movement are effected. The same vernier adjustment of spring tension may be alternatively effected by a helical coil 54 of wire concentrically rotatably mounted upon the projecting end of bushing 47 as depicted in FIGURE 5.

As a further modification that may be incorporated in the electric switch, means may be provided to selectively lock the hammer 22 in a position out of engagement with the contact strip 42. This is sometimes desirable to establish a normal switch condition of open circuit at pin 38 and closed circuit at pin 39 until such time as the lock means is released and the delay determined by bellows expansion is timed out. To this end the stop 34 may be provided with a notch 56 that is engageable with the pin 33 upon appropriate rotation of the plunger 21. The notch is positioned such that when it is engaged by the pin, the hammer is engaged at a point along the upper surface of the spiral groove 28 whereat the hammer is held out of contact with the contact strip 42. Thus until the plunger is rotated to a position wherein the pin 33 will not engage the groove, the hammer is locked out of contact with the contact strip. When the plunger is not engaged by the pin 33 and the bellows is depressed to initiate a timing out cycle, at any time in the cycle the plunger may be moved upwardly on the guide pin to trip the hammer and terminate the cycle prior to its normal completion.

It is sometimes desirable that several of the electric timer switches be utilized in tandem with one switch being actuated in response to the timing out of another. For example, several of the timer switches may be utilized in the foregoing manner to control an electric oven. One switch would be employed to turn the oven on at a preset future time. When the first switch has timed out to close the main circuit to the oven heating element the first switch actuates a second switch causing the latter to time out a preset time interval. The second switch operates to, for example, short out an appropriate portion of the oven rheostat temperature control during the time interval whereby a corresponding predetermined oven temperature such as 400° is maintained. At the end of the time interval the second switch opens the short circuit across the corresponding rheostat segment and triggers a third switch to initiate timing out thereof. The third switch might be connected to short another segment of the rheostat productive of another oven temperature, for example, 300°, during its timing out period. Thus a number of switches may be employed in the foregoing manner to automatically temperature cycle an oven through a succession of preset time intervals.

To the foregoing end the switch may be modified as depicted in FIGURES 5 and 6. As shown therein a rigid tongue 57 is pivotally secured at the upper portion of the frame 23 between its sides adjacent one end edge face thereof. The tongue is of sufficient length that when it is pivoted to a downwardly extending vertical position, as depicted in FIGURES 5, 6 the tongue engages the upper surface of the bellows to retain same in a collapsed condition. A lug 58 projects outwardly from the tongue to a position that will overlie the top end of the hammer frame member 29 of another switch mounted in end to end abutment with the first switch. Thus when the hammer of the second switch (switch B in FIGURE 6) moves up in response to expansion of its bellows, the lug 58 of the first switch (switch A in FIGURE 6) is engaged by the tip end of the hammer thus pivoting the tongue of switch A out of engagement with its compressed bellows. The bellows of switch A is now free to expand and trip its hammer after the preset time interval required for complete bellows expansion.

In the switch embodiment of FIGURES 1-6, continuous variation of time delay is facilitated by variation of the maximum stroke of the hammer 22 in arriving at its tripping position through the expedient of the spiral groove 28. Variation of the time delay may be as well effected by several alternative means. As depicted in FIGURES 7 and 8 means may be provided to exert a variable pressure upon the plunger in aiding relation to the forces acting to expand the bellows. As the variable pressure is increased the time required to expand the bellows a given amount is correspondingly decreased. To facilitate generation of the variable aiding pressure the projecting end of the plunger is formed with a stop collar 59, and the upper end of a coil spring 61 concentrically disposed upon the plunger bears against the collar. A sleeve 62 mounted in the web of the frame 23 and slidably transpierced by the plunger is provided with a partitioning collar 63 for separating the convolutions of the spring 61 into selectable active and inactive portions. More particularly the collar is in the form of a circular disc cut off along a chord tangent to the plunger. The collar 63 defines an inactive spring region between the collar and top of the web of the frame 23 and an active spring region between collar 63 and collar 59. As the spring is rotated convolutions of the spring are transferred between the inactive and active regions in accordance with the number and direction of spring rotations. The greater the number of convolutions in the active region, the greater the spring pressure aiding the bellows expanding pressure. The aiding pressure and time delay of the control device are thus variable by rotation of the spring 61.

Another alternative means for varying the time delay of the device is illustrated in FIGURE 9. In the embodiment means are provided to vary the stroke of the plunger. To this end the plunger is provided with the stop collar 59 as in the embodiment of FIGURES 7 and 8. The plunger projects through an externally threaded sleeve 64 mounted on the web of the frame. A cup nut 66 threadably engaging the sleeve is also traversed by the plunger. Rotation of the nut varies the vertical position at which the nut is engaged by the collar 59 and thus determines the extent to which the bellows is depressed and vertical starting position of the stroke of the plunger. Such variation of the plunger stroke correspondingly varies the time delay of the control device.

What is claimed is:

1. A timing mechanism comprising means defining a chamber with a flow path communicating therewith and which chamber changes in volume in accordance with the rate at which fluid flows through said flow path, means associated with said chamber and movable in a defined path in response to volumetric changes therein, a plunger member positioned for engagement with said means and to be displaced therewith along said path of movement in response to said volumetric changes in said chamber and having a spiral groove thereon extending generally axially in the direction of movement of the plunger, actuating means operable upon a predetermined displacement of said movable member along said path of movement and including a hammer mounted for engagement with said spiral groove and pivotal in the direction of movement of said plunger member, said plunger member being rotatable about the axis of the spiral groove thereon for selectively varying through a continuous range the time required for said predetermined displacement of said movable member.

2. A time control device comprising a bellows having an inlet and a valved outlet for permitting passage of fluid only in response to compression of the bellows, an actuating hammer mounted for pivotal movement in response to expansion of said bellows, said hammer having a dead center position beyond which pivotal movement in either direction effects continued pivotal movement in the same direction to first and second limits, a plunger mounted for reciprocation in coaxial contact with said bellows for depressing same, said plunger rotatable about its axis and having a spiral groove concentrically formed therein with its edge surfaces engageable with said hammer, said first limit of said pivotal movement of said hammer being determined by bellows compression, and trigger means mounted in the path of pivotal movement of said hammer for actuating engagement with said hammer at said second limit.

3. A time control device comprising a bellows having an inlet and a valved outlet for permitting passage of fluid only in response to compression of the bellows, an actuating hammer mounted for pivotal movement in response to expansion of said bellows, said hammer having a dead center position beyond which pivotal movement in either direction effects continued pivotal movement in the same direction to first and second limits, said first limit determined by bellows compression, trigger means mounted in the path of pivotal movement of said hammer for actuating engagement with said hammer at said second limit, said hammer including a frame pivoted at one end with a spring secured between the free ends of the frame and a second fixed portion of the device spaced from said first fixed portion thereof, and vernier adjustment means actively engaging said spring for adjusting the tension thereof.

4. A time control device comprising a bellows having an inlet and a valved outlet for permitting passage of fluid only in response to compression of the bellows, an actuating hammer mounted for pivotal movement in response to expansion of said bellows, said hammer having a dead center position beyond which pivotal movement in either direction effects continued pivotal movement in the same direction to first and second limits, said first limit determined by bellows compression, trigger means mounted in the path of pivotal movement of said hammer for actuating engagement with said hammer at said second limit, and catch means mounted for engagement in a first position with said bellows to prevent expansion thereof and movement to a second position out of engagement with said bellows, said catch means engageable with the hammer of a like timing mechanism upon movement thereof to said second limit to be responsively moved from said first to second position.

5. A time control device comprising a base having inlet and outlet passages therethrough, a bellows mounted in upright position upon said base in communication with said passages, a check valve means in said outlet passage to permit passage of fluid only in response to compression of the bellows, a support frame extending from said base and having an upper portion overlying said bellows, an actuating hammer pivotally mounted upon said frame having a dead center position beyond which upward and downward pivotal movement effects continued pivotal movement in the same direction, trigger actuated means mounted on said frame for engagement by said hammer upon upward pivotal movement beyond said dead center position, a vertical guide pin extending upwardly from said bellows, a plunger slidably and rotatably mounted upon said pin and extending through an aperture in said upper portion of said frame in reciprocable relation thereto, said plunger having a spiral groove concentrically formed therein with its edge surfaces engageable with said hammer, and a flow control unit in said inlet passage establishing a predetermined fixed resistance to flow therethrough.

6. A time control device according to claim 5, further defined by said hammer including a frame member pivotally secured to said support frame and a spring secured to the free end of said frame member, a bushing extending through said support frame adjacent the pivot point of said frame member and having an exteriorly projecting end with a longitudinally extending slot, said spring extending through said bushing and having a reentrantly turned portion engaging said slot, and a rotatable member concentrically mounted upon said bushing and having a helical edge engaging the reentrantly turned portion of said spring.

7. A time control device according to claim 5, further defined by a tongue pivotally secured to the upper portion of said support frame and engageable with said bellows in collapsed condition when the tongue is pivoted to a downwardly extending vertical position, and a lug projecting outwardly from said tongue and adapted to engage the free end of the hammer of a like time control device mounted in end to end abutment with the instant timing device upon upward pivotal movement of the hammer of the like device.

8. A time control device according to claim 5, further defined by said trigger means comprising electrical contacts carried by said support frame, and at least one resilient electrical contact strip mounted upon said support frame and engageable by said hammer upon upward pivotal movement thereof beyond said dead center position for responsive movement into or out of engagement with said contacts.

9. A time control device according to claim 5, further defined by a stop depending from the upper portion of said support frame, and a projecting member extending radially from said plunger engageable with said stop to limit the rotational movement of the plunger.

10. A time control device according to claim 9, further defined by said plunger having a notch engageable with said stop, said notch positioned relative to said spiral groove such that when the notch engages the stop the hammer engaging the groove is prevented from operatively engaging said trigger actuated means.

11. A time control device according to claim 9, further defined by said upper portion of said support frame having a bore radially displaced from said aperture and forming the termination of a keyway extending therefrom, said keyway permissive to passage of said pin therethrough, said stop removably inserted in said bore.

12. A time control device comprising a base having inlet and outlet passages therethrough, a bellows mounted in upright position upon said base in communication with said passages, check valve means in said outlet passage to permit passage of fluid only in response to compression of the bellows, a flow control unit in said inlet passage establishing a predetermined fixed resistance to flow therethrough, a support frame extending from said base and having an upper portion overlying said bellows, a plunger reciprocably mounted in said upper portion and secured to said bellows, trigger means carried upon said support frame for actuating engagement by said plunger at a fixed longitudinal position thereof, a stop collar at the upper end of said plunger, a bushing mounted in said upper portion of said frame transpierced by said plunger and having a cut off circular collar with a flat edge tangent to said plunger, and a spring concentrically disposed on said plunger with active convolutions between said stop collar and bushing collar and inactive convolutions between said bushing collar and upper portion of said frame.

13. A time control device comprising a base having inlet and outlet passages therethrough, a bellows mounted in upright position upon said base in communication with said passages, check valve means in said outlet passage to permit passage of fluid only in response to compression of the bellows, a flow control unit in said inlet passage establishing a predetermined fixed resistance to flow therethrough, a support frame extending from said base and having an upper portion overlying said bellows, a plunger reciprocably mounted in said upper portion and secured to said bellows, trigger means carried upon said support frame for actuating engagement by said plunger at a fixed longitudinal position thereof, a stop collar at the upper end of said plunger, a bushing mounted in said upper portion of said frame transpierced by said plunger and having an externally threaded portion projecting upwardly from said upper portion, and an apertured cap nut transpierced by said plunger and threadably engaging the externally threaded portion of said bushing.

References Cited by the Examiner

UNITED STATES PATENTS

| 2,866,862 | 12/1958 | Bachi | 200—34 |
| 2,881,285 | 4/1959 | Bank | 200—34 X |
| 2,899,523 | 8/1959 | Flatet et al. | 200—34 X |
| 3,090,095 | 5/1963 | Moore | 200—38 X |

BERNARD A. GILHEANY, *Primary Examiner.*